(12) United States Patent
Dubettier-Grenier et al.

(10) Patent No.: US 9,644,533 B2
(45) Date of Patent: May 9, 2017

(54) METHOD AND APPARATUS FOR SUPPLYING A COMBUSTION CHAMBER WITH NITROGEN

(71) Applicant: L'AIR LIQUIDE, SOCIETE ANONYME POUR L'ETUDE ET L'EXPLOITATION DES PROCEDES GEORGES CLAUDE, Paris (FR)

(72) Inventors: Richard Dubettier-Grenier, La Varenne Saint Hilaire (FR); Sylvain Gerard, Saint-Cloud (FR); Loïc Joly, Paris (FR)

(73) Assignee: L'Air Liquide Société Anonyme Pour L'Étude Et L'Exploitation Des Procedes Georges Claude, Paris (FR)

(*) Notice: Subject to any disclaimer, the term of this patent is extended or adjusted under 35 U.S.C. 154(b) by 260 days.

(21) Appl. No.: 14/359,155

(22) PCT Filed: Nov. 23, 2012

(86) PCT No.: PCT/FR2012/052716
§ 371 (c)(1),
(2) Date: May 19, 2014

(87) PCT Pub. No.: WO2013/076435
PCT Pub. Date: May 30, 2013

(65) Prior Publication Data
US 2014/0360201 A1    Dec. 11, 2014

(30) Foreign Application Priority Data
Nov. 25, 2011 (FR) .................. 11 60792

(51) Int. Cl.
*F02C 3/28* (2006.01)
*F02C 3/30* (2006.01)
(Continued)

(52) U.S. Cl.
CPC ............ *F02C 3/28* (2013.01); *F02C 3/30* (2013.01); *F23L 7/00* (2013.01); *F25J 3/0403* (2013.01);
(Continued)

(58) Field of Classification Search
CPC ....... F02C 3/28; F02C 3/30; F23L 7/00; F25J 3/0403; F25J 3/04157; F25J 3/04545;
(Continued)

(56) References Cited

U.S. PATENT DOCUMENTS 5,251,433 A * 10/1993 Wallace ............... F01K 23/068
48/197 R
5,865,023 A    2/1999 Sorensen et al.
(Continued)

OTHER PUBLICATIONS

Smith A.R. et al., "Next-Generation Integration Concepts for Air Separation Units and Gas Turbines," Journal of Engineering for Gas Turbines and Power, ASME, New York, NY, vol. 119, No. 2 Apr. 1, 1997.
(Continued)

*Primary Examiner* — Steven Sutherland
(74) *Attorney, Agent, or Firm* — Justin K. Murray

(57) ABSTRACT

In a method for supplying nitrogen to a combustion chamber, gaseous nitrogen (9) is drawn off from an air separation unit (7) at a first pressure, the nitrogen is compressed in at least two stages (C1, C2) of a nitrogen compressor and sent to a combustion chamber (25) at a second pressure, which is the output pressure of the last stage (C3) of the nitrogen compressor, between two stages of the nitrogen compressor the nitrogen is humidified by direct contact in passing through a contactor (17) supplied at its top with water, and the humidified nitrogen is compressed in at least one stage of the nitrogen compressor and sent to the combustion chamber.

15 Claims, 2 Drawing Sheets

(51) Int. Cl.
   *F23L 7/00* (2006.01)
   *F25J 3/04* (2006.01)
(52) U.S. Cl.
   CPC ....... *F25J 3/04157* (2013.01); *F25J 3/04545* (2013.01); *F25J 3/04575* (2013.01); *F25J 3/04618* (2013.01); *F25J 2205/34* (2013.01); *F25J 2230/04* (2013.01); *F25J 2270/90* (2013.01); *Y02E 20/18* (2013.01)
(58) Field of Classification Search
   CPC .. F25J 3/04575; F25J 3/04618; F25J 2205/34; F25J 2230/04; F25J 2270/90
   USPC ......................................................... 60/775
   See application file for complete search history.

(56) References Cited

U.S. PATENT DOCUMENTS

| | | | | |
|---|---|---|---|---|
| 6,295,838 | B1 * | 10/2001 | Shah | F25J 3/04018 62/643 |
| 6,508,053 | B1 * | 1/2003 | Ha | F25J 3/04157 60/39.12 |
| 2009/0056303 | A1 | 3/2009 | Araki et al. | |
| 2010/0199558 | A1 * | 8/2010 | Steele | C10K 1/004 48/76 |
| 2011/0277860 | A1 | 11/2011 | Mazumdar et al. | |

OTHER PUBLICATIONS

PCT/FR2012/052716, International Search Report, Apr. 4, 2013 (3 pp).

* cited by examiner

METHOD AND APPARATUS FOR SUPPLYING A COMBUSTION CHAMBER WITH NITROGEN

CROSS REFERENCE TO RELATED APPLICATIONS

This application is a §371 of International PCT Application PCT/FR2012/052716, filed Nov. 23, 2012, which claims the benefit of FR1160792, filed Nov. 25, 2011, both of which are herein incorporated by reference in their entireties.

TECHNICAL FIELD OF THE INVENTION

The present invention concerns a method and apparatus for supplying nitrogen to a combustion chamber.

BACKGROUND

An air-separation unit is often used for supplying nitrogen to a combustion chamber. The fuel for the combustion chamber may come from gasification of a fuel with oxygen, the oxygen also coming from the air-separation unit.

SUMMARY OF THE INVENTION

The present invention proposes a method for saturating with water and preheating the nitrogen during compression thereof before introduction into the combustion chamber. This invention enables heat to be recovered from the air-separation unit to the combustion chamber and to reduce the requirement for nitrogen.

The invention in particular proposes a method optimising the efficiency of a factory for producing electricity by gasification of coal with oxygen and combined cycle, or IGCC.

The synthesis gas produced by the gasification of coal in the presence of oxygen is generally purified of its impurities (e.g. mercury, sulphur-containing compounds, $CO_2$, etc.) and diluted by an inert gas (i.e. non-combustible; e.g. nitrogen, steam, $CO_2$, etc.) before or after being mixed with a flow of air and being introduced (under pressure) into a combustion chamber from which the fumes will be expanded through a generating turbine.

The role of the diluting gas is to limit the flame velocity in the combustion chamber, to limit the oxidising character of the gaseous mixture and to limit the flame temperature peaks, thus limiting the production of nitrogen oxides to concentrations in accordance with environmental regulations.

In the case of gasification with oxygen, the inert gas diluting the synthesis gas is conventionally nitrogen coproduced by the air-separation unit (ASU), often with steam added in order to improve the inerting capacity of the dilution gas in addition to providing a larger quantity of sensible heat to the turbine. This is because the inerting capacity of the dilution gas being directly related to its thermal capacity, the addition of steam to the nitrogen coproduced by the apparatus affords better reduction of the thermal stresses in the combustion chamber than the use of nitrogen alone (for the same volume flow of fumes to the turbine). The steam is also used to preheat the synthesis gas and/or the mixture of diluting gas in order to improve the productivity of the generating turbine.

Several documents describe the humidifying of nitrogen by direct contact at substantially the pressure at which the nitrogen enters the gas turbine, for example EP-A-1001149, U.S. Pat. No. 5,865,023, US2007/0119176 and "Integration of Gas Turbine and Air Separation Unit for IGCC Power Plants" by November, 1993.

The Novem report further indicates that the nitrogen is pressurised to the pressure of the combustion chamber, mixed with synthesis gas and then saturated with water.

US-A-2011:0277860 describes compression of dry nitrogen to be sent to a gas turbine, without any humidifying.

The present invention proposes a method for preheating and saturating the dilution nitrogen while minimising or even doing away with the use of steam, making it possible to maximise the use of steam elsewhere (e.g. production of electricity), and to limit the portion of nitrogen taken off from the air-separation unit that has to be compressed in order to constitute the dilution gas.

The dilution nitrogen coming from the air separation apparatus (for example at a pressure of 4 bar absolute) must be compressed in order to achieve the pressure of the combustion chamber (i.e. between 15 and 100 bar absolute); this compression may be done by a multi-integrated radial compressor driven by an electric motor or by a steam turbine. During the compression of the dilution nitrogen, the invention proposes to saturate the dilution nitrogen with steam by means of gas-liquid contactors supplied by the nitrogen and a flow of water in liquid form.

Preferably, at the discharge from each compression stage, the dilution nitrogen is saturated with steam by this means. At the end of the compression, the nitrogen can be heated by heat exchange with a fluid heated in contact with the compressed air supplying the air-separation unit; the temperature level reached by the compressed nitrogen is here around 200° C. to 250° C. The nitrogen can then once again be enriched with water, or even saturated, by a new gas-liquid contactor. Finally, the nitrogen, optionally saturated with water, can be superheated (electric heater or using steam or exchange with another fluid of the ASU, conventionally from 50° C. to 100° C. above its saturation point, before being directed to the combustion chamber.

Moreover, the flow of water used in the gas-liquid contactors for the saturation may be preheated by a fluid from the ASU (such as the air discharged from the main air compressor or an air supercharger) to a temperature of around 150° C. in order to maximise the quantity of water introduced by saturation of the flow of nitrogen. This optimisation is relevant in particular for injections situated downstream of the compression stages.

This is because the intermediate contactors, used to saturate the compressed nitrogen with water, also have the role of cooling the gas before the following compression stage and thus improving the efficacy of the compression. Preheating the water used for saturation of the nitrogen in the intermediate compression stages would therefore reduce the efficacy of the compression.

The humidification between two compression stages can reach high degrees of humidification (more than 10% water in the nitrogen) without the compression requiring too much energy, due to the cooling of the nitrogen between two stages. Adiabatic compression followed by humidification as recommended in "Next Generation Integration Concepts for Air Separation Units and Gas Turbines" by Smith et al, Transactions of the ASME, Vol 119, April 1997, allows the same water content to be achieved. However the energy of compression is much higher.

The flow rate of water supplying the gas-liquid contactors is adjusted so that there is no condensate at the discharge from the contactors; this is because a flow rate greater than this limit would cause thermal losses, degrading the advantage of the invention.

The invention therefore makes it possible to produce a preheated mixture of nitrogen-steam dilution gas without taking off steam; the steam is therefore advantageously fully exploited at the generating turbine (except for that possibly used at the superheater), also without taking off heat on the air flow emerging from the turbocompressor and supplying the combustion chamber. In summary, this invention can make it possible to transfer heat from the air separation unit to the combustion chamber of the turbine, to decrease the nitrogen taken off from the unit as a dilution gas and finally to reduce the mass charge to the turbine supplied by the combustion chamber (at iso-energy) and to maintain the mechanical stresses on the rotor within the required limits. This invention applies for example to a unit for gasifying coal or oil coke or heavy residue with oxygen (or even air), with or without a $CO_2$ capture system.

The solution proposed has been compared with a solution where the dilution nitrogen is not diluted with steam. In this example, the contactors were placed at the discharge from the first and second compression stages of a three-stage compressor (no contactors downstream of the last compression stage).

For an IGCC power station of 450 MWe using, in the reference case, 204,000 $Nm^3/h$ of dilution nitrogen, the innovation proposed makes it possible, at constant enthalpy, to introduce 10,000 $Nm^3/h$ of steam substituted for 13,000 $Nm^3/h$ of pressurised nitrogen.

The electrical gain resulting on the machines of the air separation unit is approximately 1.2 MW, that is to say 0.3% of the total electrical production of the IGCC power station.

Compared to adiabatic compression with only final saturation (as in the case of Smith et al) the nitrogen compressor with humidification of nitrogen between two stages consumes far less energy for a similar amount of water.

Compared to a centrifugal compression with only final saturation, the nitrogen compressor with humidification of nitrogen between, two stages allows far more water to be introduced (8% as opposed to 2%).

In a variant of the invention, the nitrogen issuing from the air separation unit may also be saturated with water as soon as it enters the compressor, which makes it possible to produce chilled water and to reduce the energy consumption of the refrigeration unit upstream of the air purification unit by adsorption.

According to one embodiment of the invention, there is provided a method for supplying nitrogen to a combustion chamber, in which: gaseous nitrogen is drawn off from an air separation unit at a first pressure, the nitrogen is compressed in a nitrogen compressor and sent to a combustion chamber at a second pressure, which is the output pressure of the last stage of the nitrogen compressor, characterised in that, the nitrogen compressor comprises at least two stages and between two stages of the nitrogen compressor, the nitrogen is humidified by direct contact in passing through a contactor supplied at its top with water, and the humidified nitrogen is compressed in at least one stage of the nitrogen compressor.

According to another object of the invention, there is provided a method for supplying nitrogen to a combustion chamber is provided in which: gaseous nitrogen is drawn off from an air separation unit at a first pressure, and the nitrogen is compressed in at least two stages of a nitrogen compressor and sent to a combustion chamber at a second pressure, which is the output pressure of the last stage of the nitrogen compressor, characterised in that, between two stages of the nitrogen compressor, the nitrogen is humidified by direct contact in passing through a contactor supplied at its top with water and the humidified nitrogen is compressed in at least one stage of the nitrogen compressor and sent to the combustion chamber.

According to other optional aspects:
- all the water sent to the contactor is transferred to the gaseous flow of nitrogen;
- the water sent to the contactor is at a temperature that differs by not more than 10° C., or even than 5° C., from ambient temperature;
- the water sent to the contactor is at an ambient temperature;
- the nitrogen is also humidified in a contactor downstream of the last stage of the nitrogen compressor;
- the water sent into the contactor downstream of the last stage of the nitrogen compression is preheated by a flow from the air-separation unit;
- the nitrogen is humidified solely by direct contact with the water;
- a gas from the combustion chamber is expanded in a turbine;
- the combustion chamber is supplied by a fuel coming from a gasification unit, the gasification unit being fed with gaseous oxygen coming from the air-separation unit;
- only part of the water sent to the contactor is transferred to the gaseous flow of nitrogen and the excess water emerging from the contactor in liquid form is used as chilled water in the air-separation unit.

According to another embodiment of the invention, there is provided an apparatus for feeding nitrogen to a combustion chamber comprising a compressor, at least one direct-contact contactor disposed so as to receive the nitrogen compressed in a stage of the compressor and to send compressed and humidified nitrogen to the next stage of the compressor as well as means for sending water to the at least one contactor and at least one conduit for sending the compressed and humidified nitrogen from the last stage of the compressor to the combustion chamber, wherein the compressor has at least two stages, in that the contactor is connected downstream of a stage of the compressor and upstream of another stage of the compressor to received compressed nitrogen and to send humidified nitrogen to the following stage, means for sending the compressed and humidified nitrogen from the last stage of the compressor to the combustion chamber via the least one conduit.

The apparatus may comprise means for humidying the nitrogen by direct contact downstream of the last stage of the compressor or not.

The contactor is preferably a cooling means for the compressed nitrogen.

The contactor possibly has no exit means for liquid

According to another subject matter of the invention, there are provided an air-separation unit integrated with a gas turbine comprising an air-separation unit, a unit for compressing nitrogen coming from the air-separation unit, comprising a compressor having at least two stages, at least one direct-contact contactor disposed so as to receive nitrogen compressed in a stage of the compressor and to send compressed and humidified nitrogen to the next stage of the compressor as well as means for sending water to at least one contactor, a combustion chamber, a turbine, means for sending a combustion gas from the combustion chamber to the turbine and means for sending compressed and humidified nitrogen from the last stage of the compressor to the combustion chamber and/or to the turbine.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
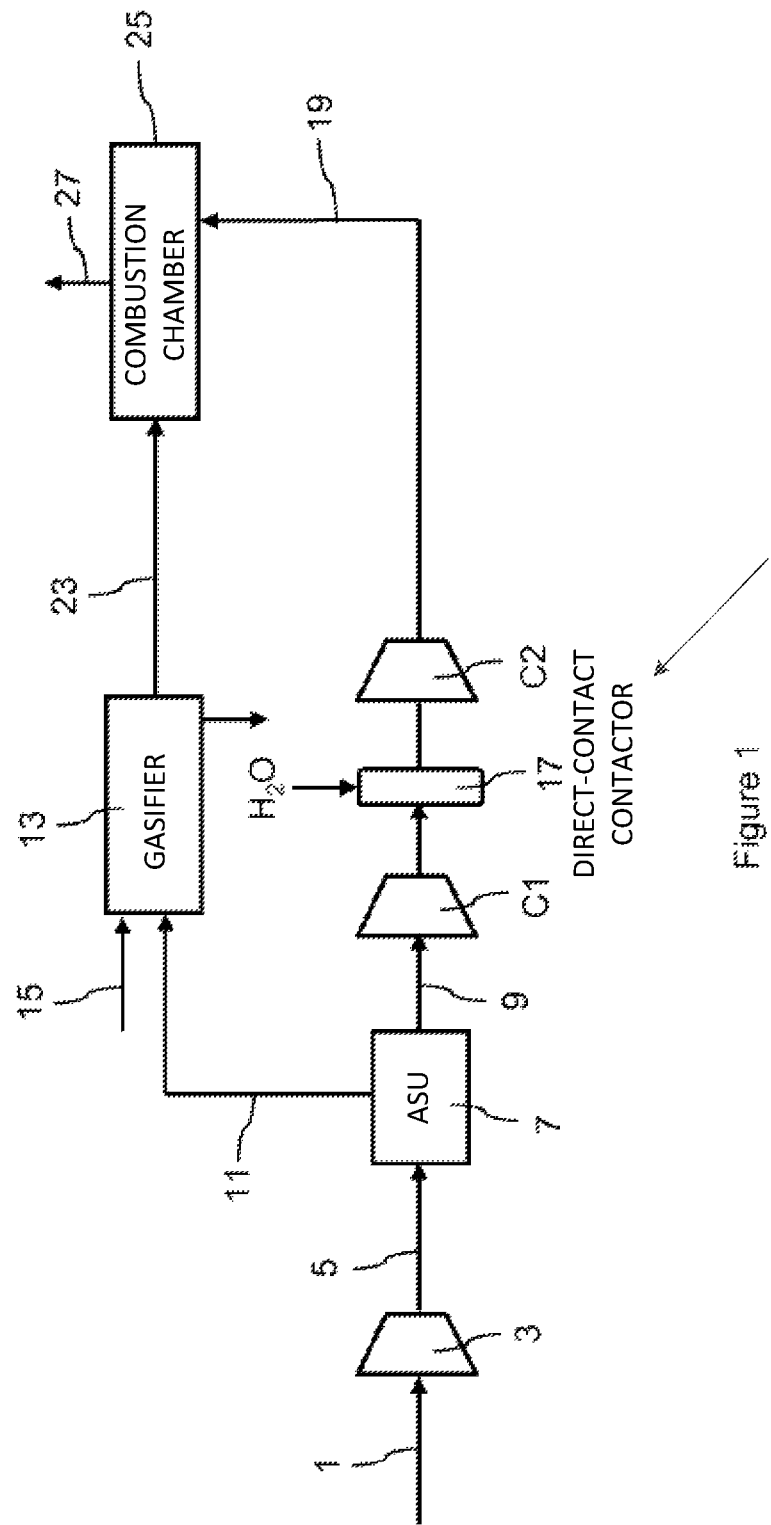
FIG. 1 shows an embodiment of the invention.

The invention will be described in more detail with reference to the figures. In FIG. 1, an air flow 1 is compressed in an air compressor 3 and then separated in an air-separation unit 7 by cryogenic distillation. If the aim of the invention is simply to produce nitrogen, other separation methods may be used. The nitrogen 9 is compressed in a compressor with two stages C1; C2. Between the two stages and downstream of the stage C1 there is a direct-contact contactor 17 supplied at its top with water. All the water is transferred to the gaseous flow of nitrogen, which is then compressed in the stage C2. The compressed and humidified nitrogen 19 is sent to a combustion chamber 25. The combustion chamber 25 is also fed with a synthesis gas 23 coming from a gasifier 13. The gasifier optionally receives oxygen 11 from the air-separation unit 7 and a fuel 15, for example natural gas or coal.

The gas 27 produced by the combustion chamber 25 is expanded in a turbine in order to supply electricity. In an optional embodiment, only part of the water sent to the contactor (17, 117, 217) is transferred to the gaseous flow of nitrogen, with the excess water (18, 118, 218) emerging from the contactor(s) in liquid form and being used as chilled water in the air separation unit (such as for chilling the air discharged from the main air compressor or an air supercharger).

Figure 2:
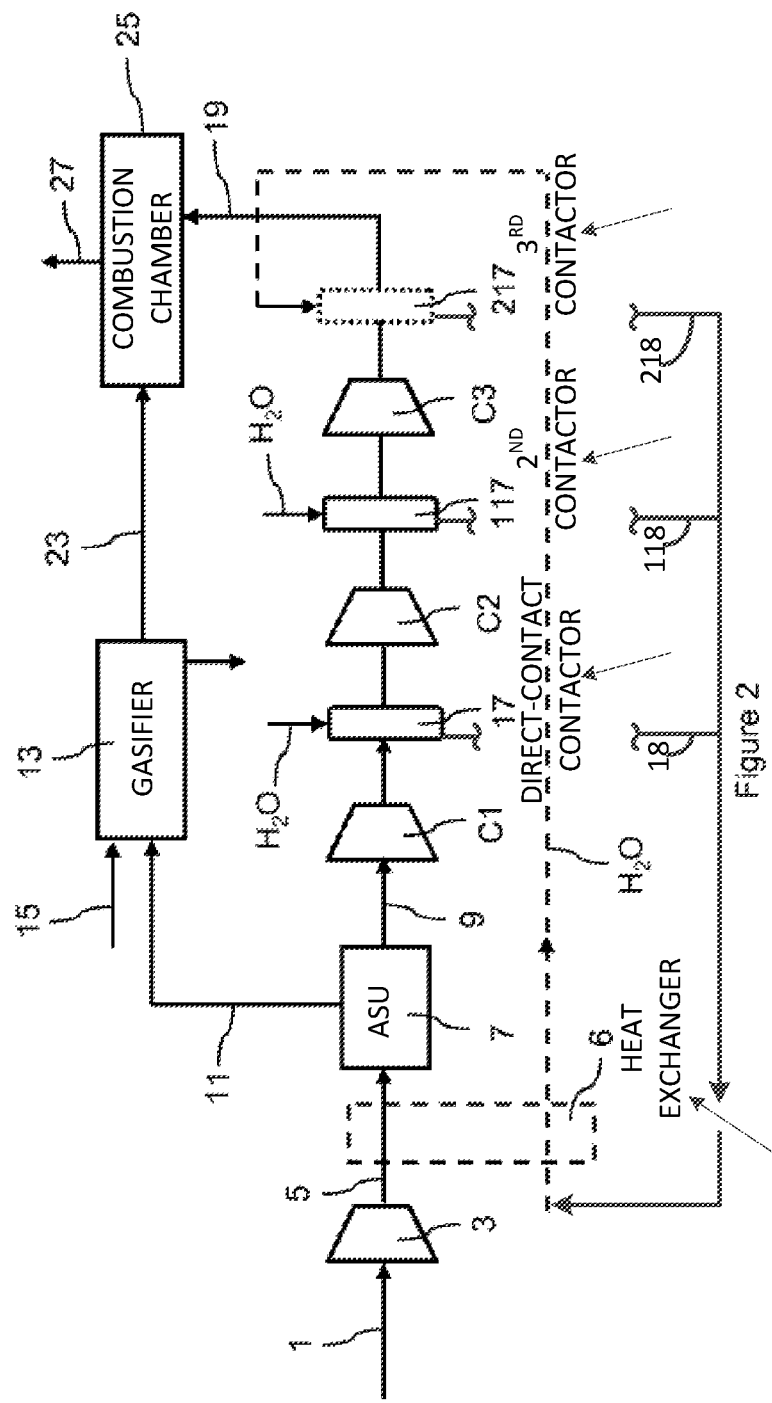
FIG. 2 shows an embodiment of the invention.

In FIG. 2, the nitrogen is compressed in a three-stage compressor, with a contactor between each pair of stages and downstream of the first stage. An air flow 1 is compressed in an air compressor 3 and then separated in an air separation unit 7 by cryogenic distillation. If the aim of the invention is simply to produce nitrogen, other separation methods may be used. The nitrogen 9 is compressed in a compressor with three stages C1, C2, C3. Between the first two stages and downstream of first stage C1 there is a direct-contact contactor 17 supplied at its top with water. All the water is transferred to the gaseous flow of nitrogen, which is then compressed in the stage C2. The compressed and humidified nitrogen 19 is sent to a second direct-contact contactor 117, where it is humidified and then compressed in the stage C3. The nitrogen compressed in the state C3 is optionally sent to a third contactor 217 in order to be humidified and is then sent to a combustion chamber 25 or to a turbine that expands a combustion gas produced by the combustion chamber. The water sent to the contactor 217 may optionally be preheated, optionally by exchange of heat in an exchanger 6 with the compressed air 1 sent to the unit 7, supercharged air or another hot flow. If the water used for saturation after the last stage is hotter, it will thus preheat the dilution nitrogen before the combustion chamber. The combustion chamber 25 is also supplied with a synthesis gas 23 coming from a gasifier 13. The gasifier optionally receives oxygen 11 from the air separation unit 7 and a fuel 15, for example natural gas or coal.

The gas 27 produced by the combustion chamber 25 is expanded in a turbine in order to supply electricity.

One major advantage of certain embodiments of the invention is that it can replace or reduce the size of at least one interstage cooler of the compressor since the contactor produces part of the necessary refrigeration.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A method for supplying nitrogen to a combustion chamber, the method comprising the steps of:
   withdrawing gaseous nitrogen from an air separation unit at a first pressure;
   compressing the gaseous nitrogen in a nitrogen compressor having a first stage and a final stage and sending the gaseous nitrogen to a combustion chamber at a final pressure, wherein the final pressure is an output pressure of the final stage of the nitrogen compressor;
   humidifying the gaseous nitrogen downstream the first stage and upstream the final stage by direct contact by passing the gaseous nitrogen through a first contactor supplied with water to produce a humidified nitrogen, wherein the first contactor is supplied with water at a top portion of the first contactor; and compressing the humidified nitrogen in the final stage of the nitrogen compressor to form the gaseous nitrogen that is sent to the combustion chamber at the final pressure, wherein all the water sent to the first contactor is transferred to the gaseous flow of nitrogen.

2. The method as claimed in claim 1, wherein the water sent to the first contactor is at a temperature that differs by no more than 10° C. from ambient temperature.

3. The method as claimed in claim 1, wherein the nitrogen is also humidified with water in a final contactor downstream of the final stage of the nitrogen compressor.

4. The method as claimed in claim 3, wherein the water sent into the final contactor downstream of the final stage of the nitrogen compressor is preheated by a flow from the air separation unit.

5. The method as claimed in claim 1, wherein the nitrogen is humidified only by direct contact with water.

6. The method as claimed in claim 1, wherein a gas from the combustion chamber is expanded in a turbine.

7. The method as claimed in claim 1, wherein the combustion chamber is fed with a fuel coming from a gasification unit, the gasification unit being fed with gaseous oxygen coming from the air separation unit.

8. The method as claimed in claim 1, wherein the gaseous nitrogen is cooled by direct contact with the water in the first contactor.

9. The method as claimed in claim 1, wherein the water sent to the first contactor is at a temperature that differs by no more than 5° C. from ambient temperature.

10. A method for supplying nitrogen to a combustion chamber, the method comprising the steps of:
withdrawing gaseous nitrogen from an air separation unit at a first pressure;
compressing the gaseous nitrogen in a nitrogen compressor having a first stage and a final stage and sending the gaseous nitrogen to a combustion chamber at a final pressure, wherein the final pressure is an output pressure of the final stage of the nitrogen compressor;
humidifying the gaseous nitrogen downstream the first stage and upstream the final stage by direct contact by passing the gaseous nitrogen through a contactor supplied with water to produce a humidified nitrogen, wherein the contactor is supplied with water at a top portion of the first contactor; and
compressing the humidified nitrogen in the final stage of the nitrogen compressor to form the gaseous nitrogen that is sent to the combustion chamber at the final pressure, wherein only part of the water sent to the contactor is transferred to the gaseous flow of nitrogen and excess water emerging from the contactor in liquid form is used as chilled water in the air separation unit.

11. An apparatus for supplying nitrogen to a combustion chamber, the apparatus comprising:
a compressor having at least two stages;
at least one direct-contact contactor configured to receive nitrogen compressed in a stage of the compressor and to send compressed and humidified nitrogen to a next stage of the compressor;
means for sending water to the at least one direct-contact contactor; and
means for sending compressed and humidified nitrogen from a last stage of the compressor to the combustion chamber,
wherein the contactor comprises an absence of an exit means for liquid.

12. The apparatus as claimed in claim 11, wherein a direct-contact contactor is connected downstream of a first stage of the compressor and upstream of a second stage of the compressor, such that the direct-contact contactor is configured to receive compressed nitrogen from the first stage, humidify the compressed nitrogen thereby forming humidified nitrogen and then send the humidified nitrogen to the second stage.

13. The apparatus as claimed in claim 11 further comprising means for humidifying the nitrogen by direct contact downstream of the last stage of the compressor.

14. The apparatus as claimed in claim 11 further comprising an absence of humidifying means for the nitrogen downstream of the last stage of the compressor.

15. The apparatus as claimed in claim 11, wherein a contactor is a cooling means for the compressed nitrogen.

* * * * *